April 7, 1970 S. DUINKER ET AL 3,504,958

TWO-DIMENSIONAL DIGITAL LIGHT-RAY DEFLECTION SYSTEMS

Filed Aug. 2, 1966

INVENTORS
SIMON DUINKER
UWE SCHMIDT
BY Frank R. Trifari
AGENT 3,504,958
Patented Apr. 7, 1970

3,504,958

TWO-DIMENSIONAL DIGITAL LIGHT-RAY DEFLECTION SYSTEMS

Simon Duinker, Hamburg-Bahrenfeld, and Uwe Schmidt, Hamburg-Wandsbek, Germany, assignors, by mesne assignments, to U.S. Philips Corporation, a corporation of Delaware Filed Aug. 2, 1966, Ser. No. 569,649
Claims priority, application Germany, Aug. 10, 1965, P 37,428
Int. Cl. G02f *1/26;* G02b *5/04, 5/16*
U.S. Cl. 350—150 4 Claims

ABSTRACT OF THE DISCLOSURE

A digital deflection system in which a plane-polarized light-ray, for example, a laser beam, is deflected by one or more double refracting deflecting prisms in connection with associated electrically controlled polarization switching devices, the deflecting prisms being traversed by the deflected light ray several times and at different places after the direction of deflection of the ray has rotated through 90° about the optical axis of the deflection system prior to each passage through the prisms.

The invention relates to a digital light-ray deflection device in which a light ray, for example, a laser beam is electrically deflected by one or more double-refracting prisms.

Hitherto the constructions of such a light deflection system operating on the principle of a stepwise variation of the direction of propagation of the ray by means of double-refracting prisms and electrically controllable deflection devices comprised mainly the series combination of two digital light deflection devices with the associated prisms, which deflect the light ray in two orthogonal directions and transfer it.

The present invention permits reducing the number of prisms of the overall system and is characterized in that a plurality of associated deflection prisms are provided, which are traversed by the deflected light ray several times and at different places after prior to each passage through the prisms the deflection plane of the ray has been turned.

The light ray can also be deflected backwards, so that the number of prisms is reduced by a factor 2.

The device according to the invention operates, in principle, as follows;

A light ray is first passed through a one dimensional light deflection device. After the ray has left the same, the position of the plane of propagation of the deflected light ray is turned through 90° by means of passive optical elements. The axis of rotation is the optical axis of the deflection system. At the same time the light ray is deflected by further passive elements so that it traverses the light deflection device for the second time, while it is deflected at right angles to the direction of the first deflection. As a matter of course, the light ray must have sufficiently shifted in place with respect to its first passage, since although the same prisms have to be traversed, the ray has to pass through a different set of Kerr cells controlling the deflection, a virtual two dimensional deflection being otherwise not obtained.

The invention will now be described more fully with reference to the drawing.

Figure 1:
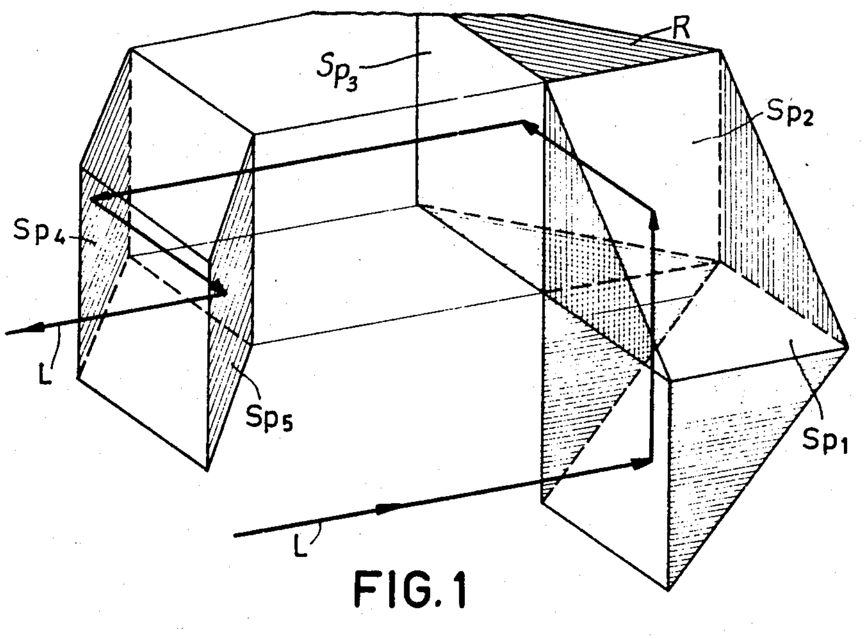
FIG. 1 shows an inverting prism.

FIG. 1 shows one embodiment of a passive, optical element R, which permits deflecting the light rays L, which may be laser rays and turning the plane of the first deflection through 90°. This element is formed by the combination of a plurality of mirror faces $Sp_1$ to $Sp_5$. Other embodiments of such elements are known. They are frequently employed in optical apparatus, for example, for the combination of a so-called Nachet prism with 90° prisms.

Figure 2:
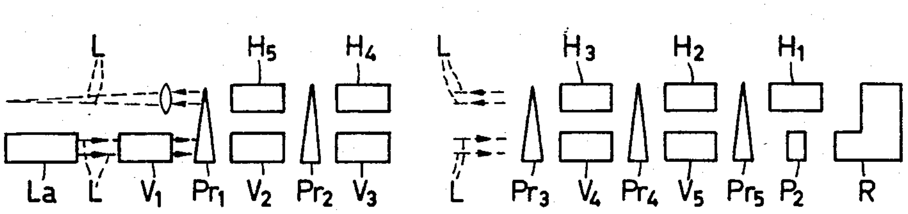
FIG. 2 shows a digital light-ray deflection device.

FIG. 2 shows an embodiment of a digital light deflection device in which each of a set of deflection prisms $Pr_1$ to $Pr_5$ is traversed twice by light rays L. Polarising switches $V_2$ to $V_5$ and $H_1$ to $H_5$ are arranged between the prisms and a switch $V_1$ is arranged between the light source $L_a$ and the prism $Pr_1$ for carrying out the two-dimensional deflection. The light rays are first deflected in a given plane, then turned through 90° by the inverting prism R and subsequently passed through the same assembly of prisms $Pr_5$ to $Pr_1$ and the set of polarising switches $H_1$ to $H_5$. The light rays L are produced here by a laser light source $L_a$ and they traverse the first deflection device $V_1$, which is formed, like the switches $V_2$ to $V_5$, by controllable Kerr cells or other polarising switches. The light rays then traverse the prisms $Pr_1$ to $Pr_5$ and the deflection devices $V_2$ to $V_5$. After the return from the inverting prism R they traverse the same prisms $Pr_5$ to $Pr_1$ and other deflection devices $H_1$ to $H_5$.

Any variations of the polarisation state of the light rays due to the inversion of direction are compensated in known manner by auxiliary optical polarising means $P_2$.

In a further embodiment the passage through the light-ray deflection device in the reverse direction as shown in FIG. 2 may be converted into a passage in the same direction, since the light rays L are deflected by the inverting prism R first so that they pass alongside the deflection system and do not traverse it. A second single inverting prism without rotational faculty arranged at the left-hand end of the deflection system passes the light rays for the second time through the deflection system so that the rays propagate in the initial direction.

Figure 3:
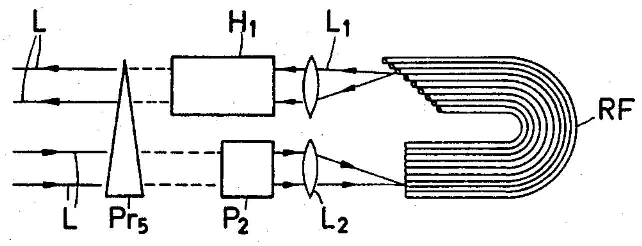
FIG. 3 shows a variant of the light-ray inversion.

FIG. 3 finally shows a further possibility of turning the plane of deflection with a simultaneous inversion of the direction of the light rays L with the aid of a bunch of light conductors of glass fiber RF, which furthermore requires optical lenses $L_1$ and $L_2$.

What is claimed is:

1. A digital light-ray deflection system comprising at least one double-refracting deflecting prism traversed by the light-ray which is deflected in one direction, an electrically controlled polarization switching device associated therewith, and means for rotating the direction of deflection of the light-ray through 90° about an optical axis of the system whereby the deflection prism is again traversed by the light-ray at a different place and again deflected.

2. A digital light-ray deflection system as claimed in claim 1 in which the means for rotating the direction of deflection of the light ray is an inverting prism.

3. A digital light-ray deflection system as claimed in claim 1, wherein the inverting prism is formed by the combination of a so-called Nachet prism and a plurality of 90° prisms.

4. A digital light-ray-deflection system as claimed in claim 1, wherein the means for rotating the direction of deflection of the light ray is a system of glass-fiber light conductors.

References Cited

UNITED STATES PATENTS

| | | | |
|---|---|---|---|
| Re. 20,346 | 5/1937 | Callier et al. | 350—286 |
| 3,020,806 | 2/1962 | Castrucci | 350—96 |

FOREIGN PATENTS

| | | |
|---|---|---|
| 994,955 | 6/1965 | Great Britain. |

OTHER REFERENCES

Naegeli et al., "The Microscope, in Theory and Practice," (Translated from the German) Swan Sonnenschein, Lowery & Co., London 1887, pp. 45–46.

DAVID SCHONBERG, Primary Examiner

P. R. MILLER, Assistant Examiner

U.S. Cl. X.R.

350—48, 53, 96, 157, 286